(12) United States Patent
Roehm

(10) Patent No.: US 8,316,959 B2
(45) Date of Patent: Nov. 27, 2012

(54) HAND-HELD POWER TOOL, IN PARTICULAR CORDLESS POWER TOOL

(75) Inventor: Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 12/837,203

(22) Filed: Jul. 15, 2010

(65) Prior Publication Data

US 2011/0017484 A1  Jan. 27, 2011

(30) Foreign Application Priority Data

Jul. 23, 2009 (DE) .................. 10 2009 027 951

(51) Int. Cl.
*B23Q 5/00* (2006.01)
(52) U.S. Cl. .................. 173/178; 173/176; 173/217
(58) Field of Classification Search .................. 173/176, 173/178, 179, 180, 216, 217, 218
See application file for complete search history.

(56) References Cited

U.S. PATENT DOCUMENTS

| 4,898,249 | A | * | 2/1990 | Ohmori | ......................... | 173/176 |
|---|---|---|---|---|---|---|
| 6,076,438 | A | * | 6/2000 | Rahm | ............................. | 81/473 |
| 6,182,673 | B1 | | 2/2001 | Kindermann et al. | | |
| 6,213,695 | B1 | | 4/2001 | Breitenmoser | | |
| 6,230,819 | B1 | | 5/2001 | Chen | | |
| 6,739,225 | B2 | * | 5/2004 | Bader et al. | ...................... | 81/475 |
| 8,002,098 | B2 | * | 8/2011 | Rahm | ......................... | 192/56.61 |
| 2002/0130007 | A1 | * | 9/2002 | Nakamura et al. | .............. | 192/38 |
| 2003/0110910 | A1 | | 6/2003 | Bader et al. | | |
| 2006/0032648 | A1 | * | 2/2006 | Scholl et al. | .................. | 173/183 |
| 2008/0271905 | A1 | * | 11/2008 | Yoshikane | ..................... | 173/109 |
| 2009/0020301 | A1 | * | 1/2009 | Aeberhard | ..................... | 173/176 |
| 2009/0223692 | A1 | * | 9/2009 | Yoshikane | ..................... | 173/133 |

FOREIGN PATENT DOCUMENTS

| GB | 2424249 A | 9/2006 |
|---|---|---|
| WO | 2004024398 A1 | 3/2004 |
| WO | 2008068103 A1 | 6/2008 |

* cited by examiner

*Primary Examiner* — Rinaldi Rada
*Assistant Examiner* — Eyamindae Jallow
(74) *Attorney, Agent, or Firm* — Kenyon & Kenyon LLP

(57) ABSTRACT

The invention is based on a hand-held power tool, in particular a cordless power tool, having a torque-limiting device that is provided for setting a maximum torque that a motor output is able to transmit to a tool-driving element. A spring mechanism equipped with at least one first disk spring is provided such that the at least one disk spring acts on at least two detent mechanisms arranged in a circumferential direction.

15 Claims, 4 Drawing Sheets

HAND-HELD POWER TOOL, IN PARTICULAR CORDLESS POWER TOOL

CROSS-REFERENCE TO RELATED APPLICATION

This application is based on German Patent Application 10 2009 027 951.2 filed Jul. 23, 2009.

BACKGROUND OF THE INVENTION

2. Field of the Invention

The invention is related to hand-held power tool, in particular a cordless power tool.

2. Advantages and Summary of the Invention

The present invention proposes a hand-held power tool, in particular a cordless power tool, having a torque-limiting device that is provided for setting a maximum torque that a motor output is able to transmit to a tool-driving element, and having a spring mechanism equipped with at least one first disk spring. The at least one disk spring acts on at least two detent mechanisms arranged in a circumference direction. In this context, a "torque-limiting device" should in particular be understood to be a device that is provided to set a maximum torque, the torque being transmitted, in at least one operating state of the hand-held power tool, by means of a motor output such as an armature shaft and/or a planetary gear set to a tool-driving element and/or a tool holder, for example in the form of a drill chuck or a socket for a hexagonal screwdriver bit in an output spindle. In this context, a "limitation" of the torque should in particular be understood to mean that the torque-limiting device can be used to set the torque that must be reached or exceeded in order for a clutch to react and/or for a transmission of torque from the motor output to the tool-driving element to be limited, particularly in that brief interruptions in the torque occur at intervals when an overload state occurs. In addition, a "detent mechanism" should in particular be understood to be a device, which, in at least one operating state—in particular such as an overload state—performs its function by means of a detent engagement procedure that stops a rotary driving of a tool, for example in the form of a drill bit or a screwdriver bit. The two detent mechanisms are preferably spaced apart from each other in the circumference direction, in particular equidistantly, around the output spindle. Basically, however, it is also conceivable to provide any number of detent mechanisms deemed to be structurally useful and advantageous by the person skilled in the art. In this context, the verb "to act on" should in particular be understood to mean that the disk spring is in contact with at least two detent mechanisms and in particular, is in direct contact with one component of each detent mechanism, and/or that a flux of force travels from the disk spring in the direction of the detent mechanisms without an interposed component. In addition, the disk spring acts on the detent mechanisms axially in the direction opposite from an output direction. In addition, "provided" should be understood to mean especially equipped and/or embodied.

The embodiment according to the invention makes it possible to achieve a space-saving and parts-saving torque-limiting device of the hand-held power tool since in particular, it is possible to dispense with components such as spring supports or washers that are built into conventional transmissions. This makes it possible to simplify assembly, thus advantageously achieving savings with regard to assembly complexity and costs.

According to another proposal, each detent mechanism has at least one first detent element. A "detent element" should in particular be understood to be an element that performs the detent action in the process of a detent engagement and/or disengagement and/or that is moved in the process of the detent engagement and/or disengagement and/or is brought by this movement into a position that prevents or disconnects the rotary driving of the tool-driving element. It is essentially conceivable for this to be any element that is deemed suitable by the person skilled in the art and can be used as a detent element, for example blocks, balls, rollers, and/or combinations thereof. The detent element can be used to produce a structurally simple, reliable torque-limiting device.

Advantageously, at least the first detent element is embodied in the form of a rolling element. In this context, a "rolling element" should in particular be understood to mean any element that is deemed suitable by the person skilled in the art and is capable of executing a rolling motion, for example a drum, a roller, a barrel, a needle, a cone, and/or in particular a ball. Preferably, all of the detent elements are embodied in the form of rolling elements, particularly in the form of balls. The implementation of the detent elements in the form of rolling elements makes it possible to achieve an embodiment of the detent mechanism that is not only advantageously space-saving but also has a particularly long service life.

It is also advantageous if the hand-held power tool, or more specifically each detent mechanism, has at least one additional rolling element that is situated on a side of the at least one detent element oriented toward the disk spring. Each detent mechanism thus has two rolling elements situated axially one behind the other in the output direction. In this case, this additional rolling element represents the component of the detent mechanism that is acted on directly by the disk spring and/or is directly contacted by it. This rolling element also directly contacts and/or acts on the first detent element and/or is likewise embodied in the form of a ball. In general, however, it would also be conceivable for the rolling element to have any of the other embodiments cited above. The additional rolling element permits a distance to be bridged from the disk spring to the first detent element and/or a flux of force to be transmitted from the disk spring to the first detent element, both in a structurally simple, inexpensive, and reliable way.

It is also advantageous if the hand-held power tool has a guide device that fixes at least the first detent element in at least one circumference direction. In this context, a "guide device" should in particular be understood to be a device that predetermines a movement direction, in particular of the detent element, and/or that limits a movement of the detent element in a particular direction, namely a circumference direction along a circumference of the working spindle. In this context, the verb "fixes" should in particular be understood to mean a fixing relative to a transmission housing. The guide device is in particular situated on an inside of the transmission housing, i.e. a side oriented toward the working spindle, and is in particular embodied as integral to said inside of the housing; in this context, "integral to" should in particular be understood to mean "of one piece with" and/or "embodied of a single cast with" and/or "comprising a single component with." Preferably, the guide device is embodied in the form of a groove, which extends essentially parallel to a main extension direction of the working spindle and whose dimension in the circumference direction of the working spindle is slightly greater than a dimension or diameter of the detent element and/or the additional rolling element. The guide device also fixes the additional rolling elements in the circumference direction of the working spindle. The number of guide devices corresponds to the number of detent mechanisms. By means of the guide device, the flux of force can be transmitted from the disk spring to the first detent element in a particularly efficient fashion. In addition, it is thus possible to define a relative position of the first detent element in relation to the additional rolling element and in particular, to reliably maintain this position during operation. In addition, this makes it possible to reliably guide and define the movement of the detent element during an engagement and/or disengagement of the torque-limiting device.

According to another proposal, the hand-held power tool has at least one adjusting element that acts directly on the at least one disk spring. In this context, an "adjusting element" should in particular be understood to be an element that is at least directly coupled to an actuating element of the torque-limiting device and/or is embodied as integral to the actuating element and by means of which, a maximum torque can be set. In this context, an "actuating element" should in particular be understood to be an element such as a button, a switch, a rocker, and/or in particular a rotatable collar that a user can adjust, in particular manually. The embodiment according the invention makes it possible for a direct adjustment of the maximum torque to be embodied in a structurally simple, direct fashion, without an interposed component, thus yielding a parts-saving and consequently inexpensive embodiment of the torque-limiting device and the hand-held power tool. In addition, the direct action results in an advantageous flux of force from the actuating element to the torque-limiting device. In addition the direct action and the savings in terms of the number of parts make it possible to achieve a short overall length of the torque-limiting device, which has a direct, advantageous effect on the low weight of a hand-held power tool. In addition, the hand-held power tool is particularly rugged in withstanding mechanical impacts.

It can also be advantageous if the adjusting element is equipped with a thread that is provided to adjustably interact with a thread of a transmission housing. In this context, a "transmission housing" should in particular be understood to be a housing in which at least one transmission, e.g. a planetary gear set, is supported or accommodated; the transmission housing preferably encompasses at least most of the transmission, specifically more than 50% of it and in particular, more than 90% of it. In particular, the transmission housing can be composed of multiple parts, thus making it possible to assure a simple assembly. In this context, "interact with" should in particular be understood to mean "engage with". Preferably, the thread can be used to set the maximum torque. By means of the thread of the adjusting element and the matching thread of the transmission housing, the torque adjustment can be carried out in a structurally simple, reliable fashion. Basically, however, it is also conceivable for the adjusting element to have a thread that interacts with a thread of another component deemed suitable by the person skilled in the art, in particular such as an actuating element.

An advantageous space-saving design can be achieved if the spring mechanism has at least one additional disk spring. Basically, however, it would also be conceivable to provide any number of springs and/or disk springs deemed suitable by the person skilled in the art. Furthermore, it is possible to minimize fluctuations in a solid compression length and in a field of force of the spring mechanism.

It is also preferable for at least the first disk spring and the additional disk spring to be connected in series. In this context, "connected in series" should in particular be understood to mean that in the main extension direction of the working spindle, the disk springs are situated axially one behind the other, particularly with their concavities facing in alternating directions. This arrangement makes it possible to achieve a space-saving design and an advantageously rigid geometry of the torque-limiting device. In addition, a desired spring force can be produced on a short axial spring path. Basically, however, it is also conceivable to provide other arrangements of disk springs; in particular, it is also possible for at least two disk springs situated one behind the other to be oriented with their concavities facing in the same direction and/or it is also conceivable other at least partially parallel disk spring arrangements deemed suitable by the person skilled in the art to be provided, which can be used alone or also in combination with disk springs arranged in series.

A preferred modification is constituted by the fact that the first disk spring and the additional disk spring have different spring characteristics, making it possible to achieve a more beneficial, in particular nonlinear or discontinuous clutch force progression of the torque-limiting device, which directly results in a broad clutch force spread. In addition, the use of differently acting disk springs in the spring mechanism makes it possible to easily adapt the adjusting characteristic of the torque-limiting device to different hand-held power tools or different lines of hand-held power tools such as cordless screwdrivers, cordless drill/drivers, cordless impact drill/drivers, or any other hand-held power tool deemed suitable to the person skilled in the art, thus yielding advantageously variable forces or adjustment possibilities for the spring mechanism.

According to another embodiment of the invention, the first disk spring and the additional disk spring have different material thicknesses. In this context, a "material thickness" should in particular be understood to be a dimension of a disk spring perpendicular to its circular surface and/or essentially in the direction of the main extension of the working spindle. By varying the material thicknesses of the disk springs, it is possible to embody the torque-limiting device in a structurally simple, inexpensive fashion. In general, however, it would also be conceivable for them to have a uniform material thickness, with the springs being arranged in layers, partially in parallel and partially in series.

According to another proposed embodiment, the first disk spring and the additional disk spring have different outer diameters and/or inner diameters. In this case, varying the outer and/or inner diameter of the disk spring(s) makes it possible to shorten and/or lengthen a lever arm between force exertion points of the detent element and/or the first disk spring and/or the additional disk spring and/or the adjusting element. The different outer and/or inner diameter makes it possible to achieve a desired spring force of the spring mechanism with a short spring path and to achieve a structurally simple embodiment.

According to another proposed embodiment, a harder-acting disk spring is positioned on a side of the spring mechanism oriented toward the detent element. In this context, a "harder-acting disk spring" should in particular be understood to mean that the disk spring has a greater spring constant than the additional disk spring and in particular, greater than all of the other springs of the spring mechanism. The term "positioned" here in particular means that the harder-acting disk spring directly contacts the detent element. This positioning makes it possible for a compressive load exerted on certain points of the detent element to be favorably transferred to the spring mechanism.

It is also possible for a softer-acting disk spring to be situated on a side of the spring mechanism oriented away from the detent element. In this case, this disk spring is in particular advantageously situated in direct contact with the adjusting means as a result of which a line load on the adjusting means, particularly in an overload state of the torque-limiting device, is converted to a surface load, which in turn results in a spreading of the line load of the adjacent spring or more specifically, of the softer-acting spring. Preferably, a contact line between the disk spring and the adjusting element is situated on a side of the disk spring oriented in the radial direction toward an adjusting thread.

A solid compression of the spring mechanism advantageously results in a blocking of the torque-limiting device. In this context, "solid compression" should in particular be understood to mean that an action of the spring mechanism has been nullified. By contrast with a conventional torque clutch, a direct solid compression of an adjusting element with a detent element can produce a more reliable torque-limiting device since it is possible to avoid disadvantageously high tolerances. It is also possible to avoid failure at high torques. Furthermore, by comparison with prior-art embodiments in which detent elements are locked directly in relation to each other, it is possible to achieve savings with regard to parts, space, and costs, which allows the size of a hand-held power tool to be reduced, making it possible to work in cramped conditions and small spaces. In addition, the disk springs can be used to manufacture a solid compression height of the spring mechanism in a particularly inexpensive, very strictly toleranced fashion. It is also possible to create a reliable locking of the torque-limiting device by means of low axial production tolerances and a rigid geometry. Moreover, it is possible to achieve short axial strokes between a locking position and a minimum clutch setting of the torque-limiting device. It is also possible to achieve a high degree of resolution or gradation at low clutching forces and a low degree of resolution or gradation at high clutching forces.

It is also advantageous if the torque-limiting device has at least one clutch that is embodied as at least partially integral to at least one component of a planetary gear set. In this context, "integral to" should in particular be understood to mean that the clutch can be separated from the planetary gear set only with a functional loss and/or that at least one component of the clutch and one component of the planetary gear set are comprised of one and the same component. The expression "at least partially" means that at least one component, e.g. a ring gear of the planetary gear set, is integral to the clutch. In this context, a "clutch" should in particular be understood to mean an interaction of one component device—in particular the detent mechanism or detent element of the detent mechanism—with a cam track in an upper surface of the ring gear, which at intervals, temporarily interrupts the flux of force when the set maximum torque is exceeded. The integral embodiment of the clutch makes it advantageously possible to achieve savings in terms of space, parts, and costs.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
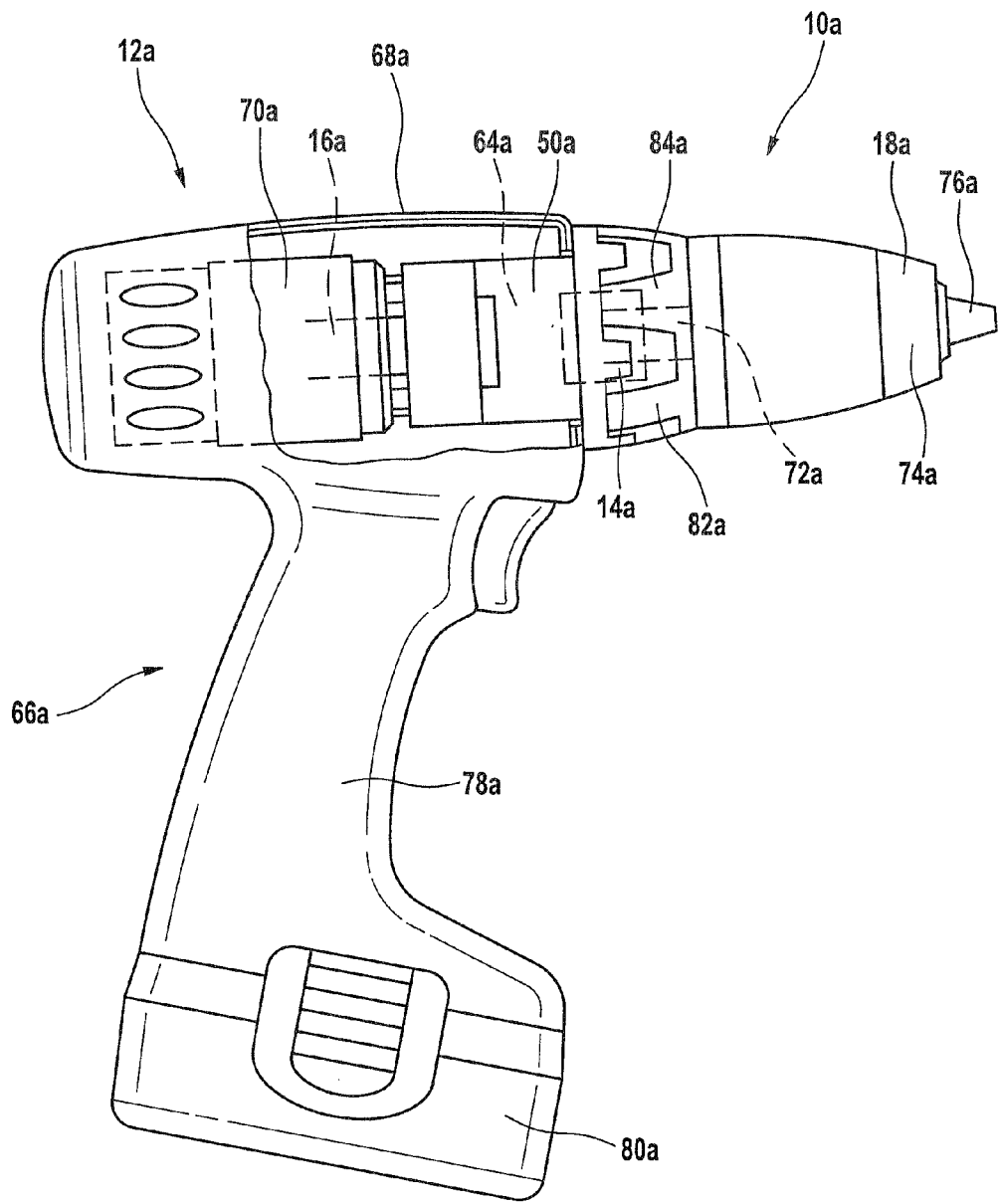
FIG. 1 shows a hand-held power tool equipped with a torque-limiting device according to the invention.

FIG. 1 shows a hand-held power tool 10a, in particular a cordless hand-held power tool 12a in the form of a cordless screwdriver 66a, having a motor 70a that is contained in a housing 68a and, by means of a motor output 16a and a planetary gear set 64a, which is not shown in detail here and is situated in a transmission housing 50a, drives an output working spindle 72a and a tool-driving element 18a or tool holder in the form of a drill chuck 74a for holding a tool 76a such as a screwdriver bit to rotate in an operating state of the rotary drive. A handle 78a extends perpendicular to the working spindle 72a and a rechargeable battery 80a can be attached to its lower end. The hand-held power tool 10a also has an actuating element 84a embodied in the form of a rotatable collar 82a by means of which a user can set a maximum torque at which a clutch 60a (FIG. 2) interrupts, temporarily and at intervals, a flux of force from the motor 70a to the tool-driving element 18a. This interruption of the flux of force is carried out by means of a torque-limiting device 14a, which is provided to set a maximum torque that the motor output 16a can transmit to the tool-driving element 18a.

Figure 2:
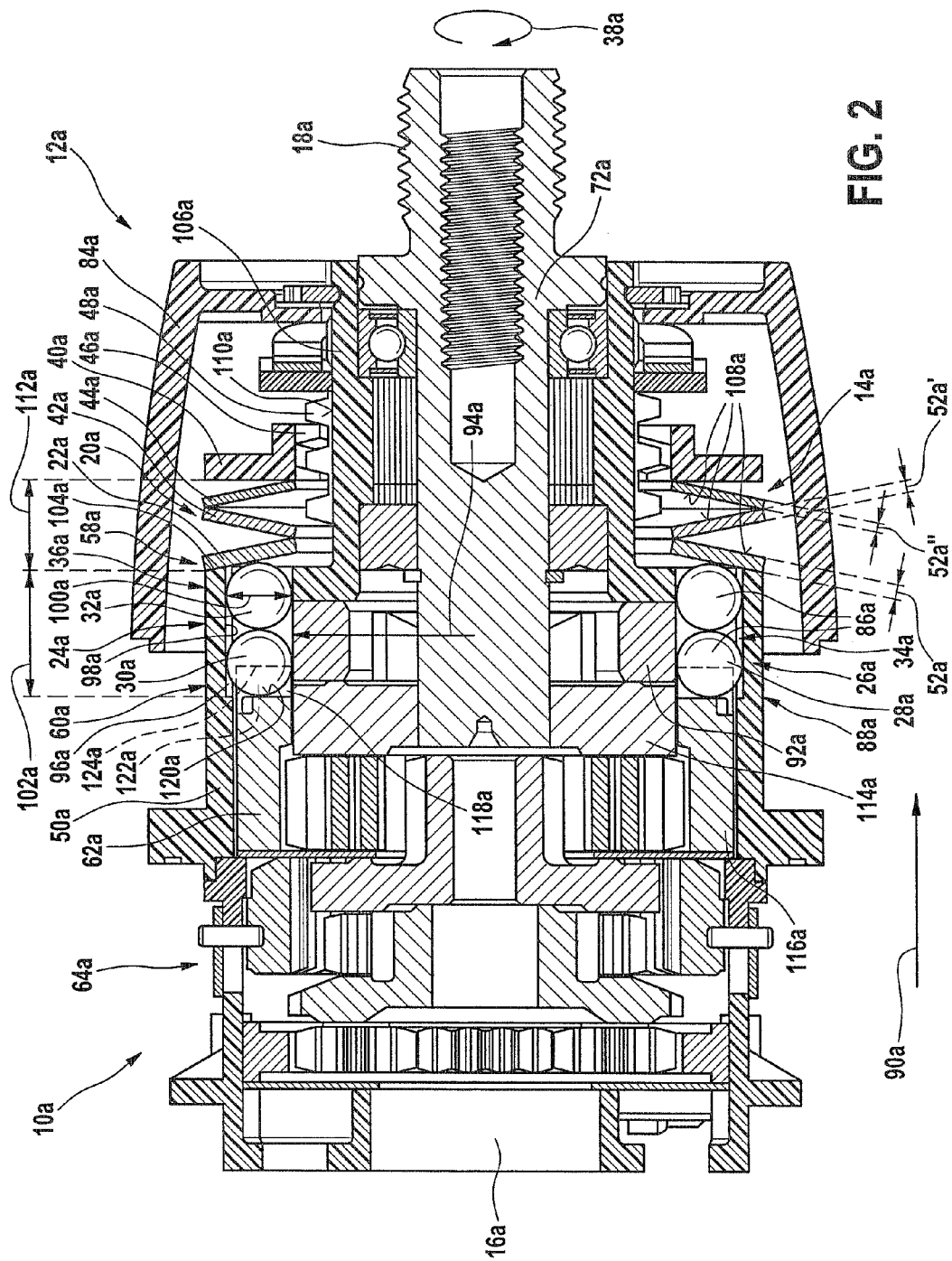
FIG. 2 shows a section through the torque-limiting device in FIG. 1, in an unblocked operating state.

As is evident in FIG. 2, which shows a section through an output-end part of the hand-held power tool 10a in an unblocked state of the torque-limiting device 14a, the hand-held power tool 10a also has a spring mechanism 20a with a first disk spring 22a that acts on a plurality of detent mechanisms 24a, 26a arranged in a circumference direction 38a. The sectional depiction, by nature of its depiction type, shows only two detent mechanisms 24a, 26a.

Each of the detent mechanisms 24a, 26a has a first detent element 28a, which is embodied as a rolling element 30a in the form of a ball 86a and is situated at an end 88a of the respective detent mechanism 24a, 26a oriented away from the spring mechanism 20a. Each of the detent mechanisms 24a, 26a also has an additional rolling element 32a, which is likewise embodied in the form of a ball 86a and is situated on a side 34a of the first detent element 28a oriented toward the disk spring 22a. The rolling element 30a is consequently situated axially in front of the additional rolling element 32a in an output direction 90a.

The detent mechanisms 24a, 26a are arranged in a circumferential direction 38a around a circumference of the working spindle 72a, between the transmission housing 50a and a transmission component 92a that extends around the working spindle 72a in the circumferential direction 38a, as a result of which, the rolling elements 30a, 32a are secured in a radial direction 94a between the transmission component 92a and the transmission housing 50a. For each detent mechanism 24a, 26a, the hand-held power tool 10a—or more specifically the transmission housing 50a—has a respective guide device 36a that fixes the first detent element 28a or the rolling elements 30a, 32a of the respective detent mechanism 24a, 26a in the circumferential direction 38a. This guide device 36a is embodied in the form of a groove 96a that is embodied as integral to the transmission housing 50a and extends in a direction parallel to the working spindle 72a on an inside 98a of the transmission housing 50a and at an end of the transmission housing 50a oriented toward the working spindle 72a. A dimension of the groove 96a in the circumferential direction 38a is slightly wider than a dimension or diameter 100a of the rolling elements 30a, 32a (not shown in detail) so that these rolling elements are held with a small amount of play in the circumferential direction 38a and are fixed in relation to each other. By means of its axial dimension 102a, which is slightly greater than a sum of the diameters 100a of the rolling elements 30a, 32a, the groove 96a defines a movement and movement direction of the detent element 28a or rolling elements 30a, 32a during a reaction of the torque-limiting device 14a. The rolling element 32a and an end 104a of the transmission housing 50a oriented toward the spring mechanism 20a end approximately flush with each other in the axial direction.

In addition, the spring mechanism 20a has two additional disk springs, namely a second disk spring 42a and a third disk spring 44a. The three disk springs 22a, 42a, 44a extend in the circumferential direction 38a, spaced radially apart from and around the working spindle 72a and also around a radially narrowed section 106a of the transmission housing 50a and are situated at the same radial height as the detent mechanisms 24a, 26a and the rolling elements 30a, 32a in order to interact with them. In addition, the three disk springs 22a, 42a, 44a are composed of steel.

The first, second, and third disk springs 22a, 42a, 44a are connected in series, i.e. the first disk spring 22a is situated axially in front of the second disk spring 42a in the output direction 90a and this second disk spring 42a is situated axially in front of the third disk spring 44a in the output direction 90a. In addition, the first disk spring 22a is situated on a side 58a of the spring mechanism 20a oriented toward the detent element 28a, in direct contact with the rolling element 32a and, due to the flush arrangement of the rolling element 32a with the end 104a of the transmission housing 50a, is also in direct contact with this end 104a. The third disk spring 44a is situated on a side of the spring mechanism 20a oriented away from the detent element 28a. The three disk springs 22a, 42a, 44a have different material thicknesses 52a, 52a', 52a"—or more precisely stated, different dimensions perpendicular to their circular surfaces 108a—as a result of which the three disk springs 22a, 42a, 44a have different spring characteristics. In this case, the disk spring 22a with the greatest material thickness 52a exerts the hardest action and the disk spring 44a with the lowest material thickness 52a" exerts the softest action.

In addition, the hand-held power tool 10a has an adjusting means 40a in the form of a ring member that directly contacts and directly acts on the third, softest-acting disk spring 44a in the radial direction on a side of the disk spring 44a oriented toward a thread 46a of the adjusting means 40a. The adjusting means 40a is operatively coupled to the actuating element 84a in the form of a collar member in the circumference direction by means of a set of teeth, not shown in detail, and is thus used to set the maximum torque at which the clutch 60a reacts and, at intervals, interrupts the flux of force from the motor 70a to the tool-driving element 18a, thus limiting the total torque to a maximum value. To enable the setting action, the adjusting means 40a is provided with the thread 46a, which adjustably interacts with a thread 48a of the transmission housing 50a; the thread 48a is formed onto an outside 110a of the narrowed section 106a of the transmission housing 50a oriented away from the working spindle 72a. Alternatively, the adjusting means 40a could have an external thread that engages with an internal thread of the actuating element 84a.

The adjustment of the maximum torque and the function of the torque-limiting device 14a will be described in greater detail below. When the actuating element 84a is rotated, the adjusting means 40a is rotated along with it and by means of the adjustable interaction of the threads 46a, 48a, an axial distance 112a between the adjusting means 40a one the one hand and the rolling element 32a and the end 104a of the transmission housing 50a on the other changes, thus prestressing the spring mechanism 20a. This prestressing is associated with a force or torque that must be exerted in order to compress the disk springs 22a, 42a, 44a so that the torque-limiting device 14a reacts and limits the flux of force from the motor 70a to the tool-driving element 18a to a particular value. In this connection, the different material thicknesses 52a, 52a', 52a" and different spring characteristics of the disk springs 22a, 42a, 44a produce a nonlinear relationship between a rotation angle of the actuating element 84a and/or adjusting means 40a on the one hand and the clutching force of the torque-limiting device 14a on the other.

During normal rotary drive operation, a torque is transmitted from the motor 70a to the tool-driving element 18a. In this case, a rotation of the motor output 16a is transmitted via the three-stage planetary gear set 64a or more precisely stated, via a planet carrier 114a of a third stage of the planetary gear set 64a, to the output spindle 72a. In this instance, the clutch 60a fixes a ring gear 116a of the third stage of the planetary gear set 64a relative to the transmission housing 50a. The clutch 60a in this case is an interaction between the detent element 28a of the detent mechanism 24a, 26a and a cam track 118a in an upper surface 120a of the ring gear 116a oriented toward the detent element 28a, as a result of which the clutch 60a is embodied as at least partially integral to a component 62a of the planetary gear set 64a.

If a force is then exerted, which lies below the set clutching force, then the spring prestressing of the disk springs 22a, 42a, 44a pushes the detent element 28a into a notch 122a of the cam track 118a, thus preventing the ring gear 116a of the third stage of the planetary gear set 64a from executing a relative motion or a rotation relative to the transmission housing 50a. The end 124a of the notch 122a oriented toward the detent element is depicted with dashed lines. The rotary operation occurs in the normal fashion.

If the force exceeds the set clutching force of the torque-limiting device 14a and if a rotary impulse is transmitted from the output spindle 72a to the ring gear 116a of the third stage of the planetary gear set 64a, then the diagonal surfaces of the spherical notch 122a, which face in the rotation direction and are not shown in detail here, cause the detent element 28a to slide out of the notch 122a in an axial movement guided by the guide path 36a, in the output direction 90a in opposition to the spring force of the spring mechanism 20a, as a result of which the detent element 28a and the notch 122a of the cam track 118a of the component 62a of the planetary gear set 64a disengage from each other, thus permitting the ring gear 116a to rotate and limiting the flux of force or torque from the motor 70a to the tool-driving element 18a to a particular value.

Figure 3:
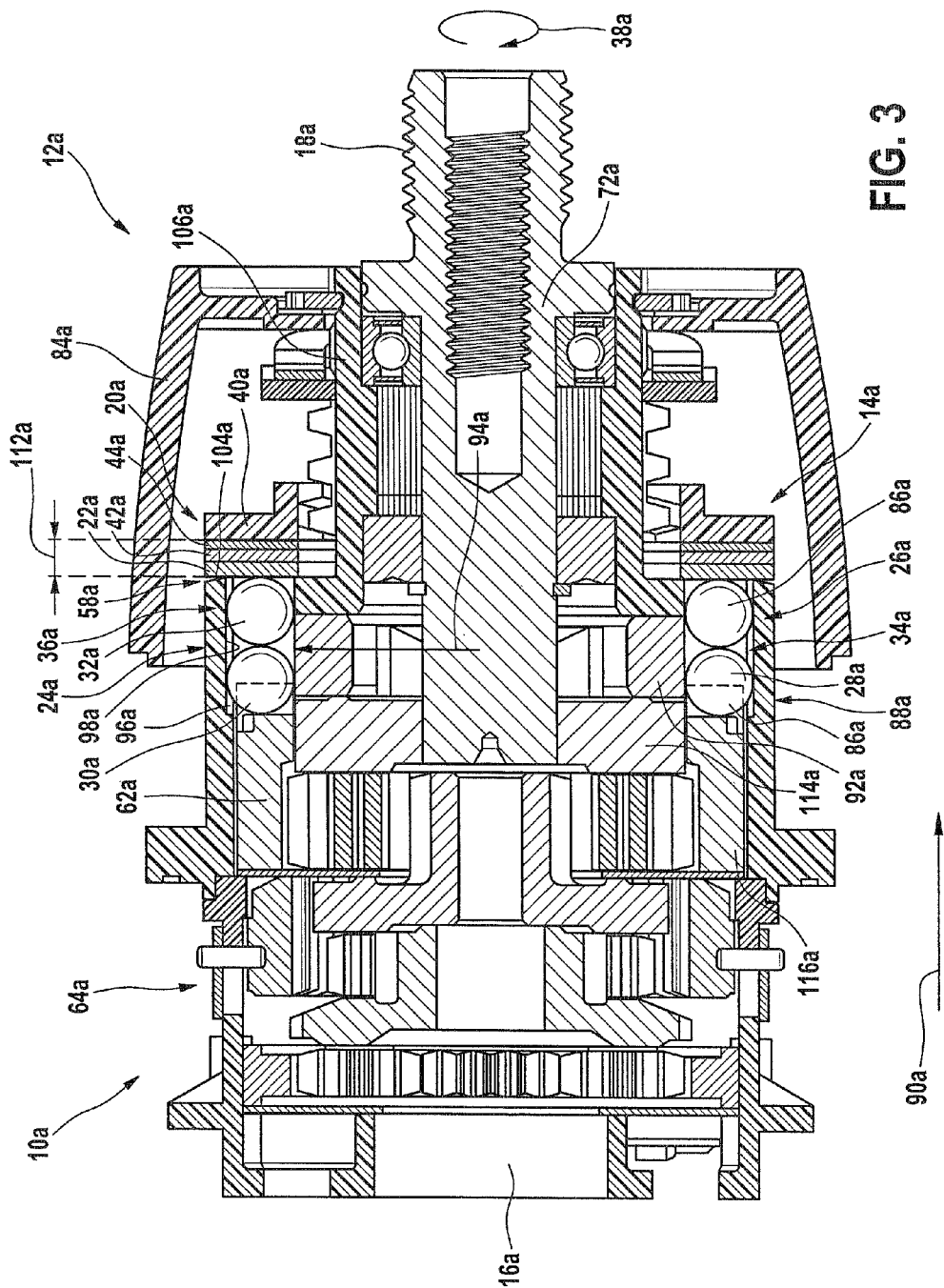
FIG. 3 shows the torque-limiting device in FIG. 1, in a blocked operating state.

FIG. 3 shows a section through the output-end part of the hand-held power tool 10a in a blocked state of the torque-limiting device 14a. In particular, this state is set in a drilling mode of the hand-held power tool 10a; the actuating element 84a and adjusting means 40a have produced a reduction of the distance 112a and a solid compression of the spring mechanism 20a and thus a blocking of the torque-limiting device 14a. Because of the achievement of the solid-compression state of the spring mechanism 20a, the disk springs 22a, 42a, 44a, which are now resting flat against one another, no longer provide sufficient axial play for movement of the detent element 28a relative to the ring gear 116a of the third stage of the planetary gear set 64a, as a result of which, it is no longer possible for the clutch 60a to disengage, interrupting the flux of force from the motor 70a to the tool-driving element 18a.

Figure 4:
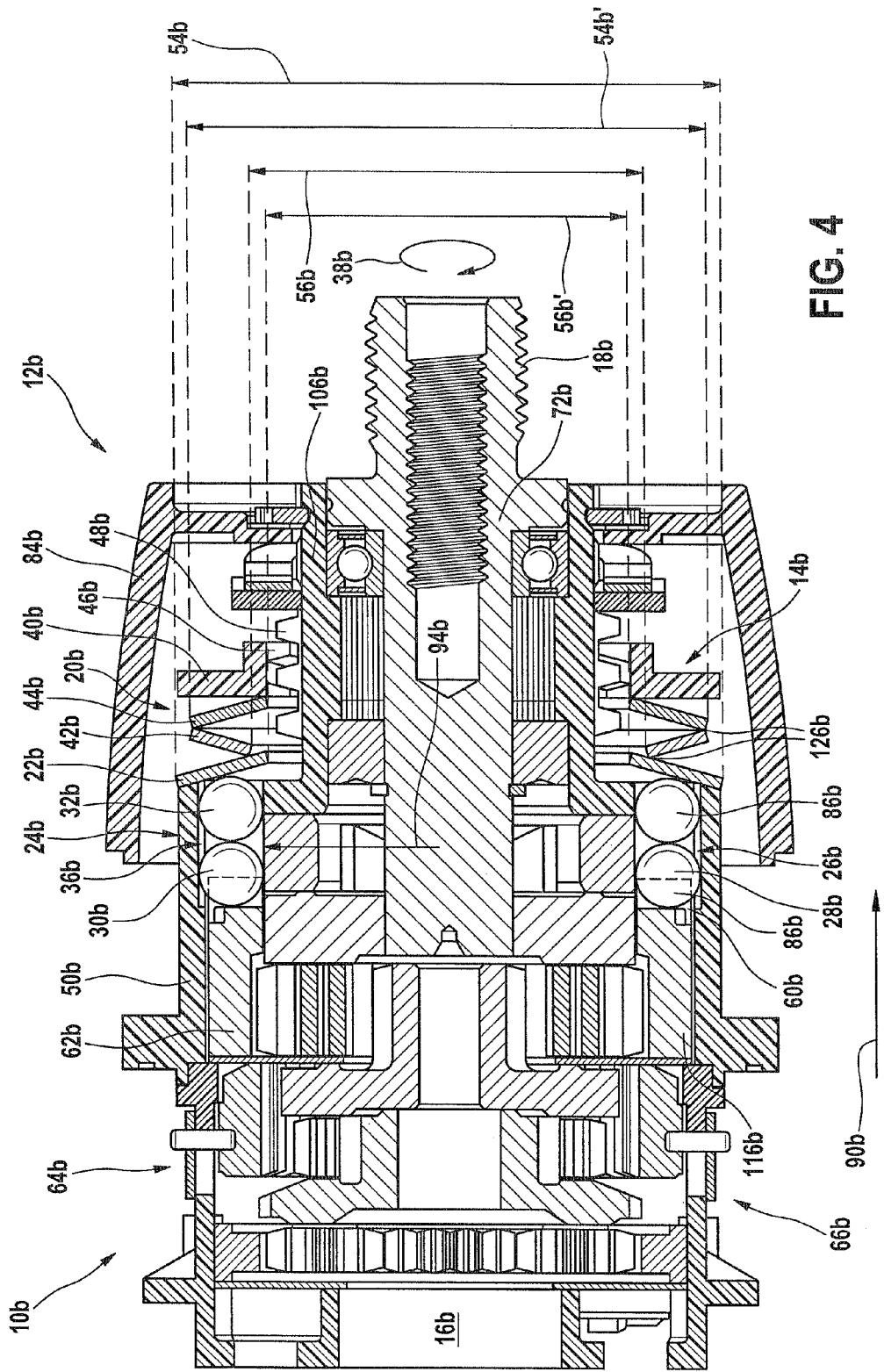
FIG. 4 shows a section through an alternatively embodied torque-limiting device, equipped with a spring mechanism with disk springs of different inner and outer diameters.

FIG. 4 shows an alternative exemplary embodiment of the hand-held power tool 10a. Essentially, components, features, and functions that remain the same have been labeled with basically the same reference numerals. To differentiate between the exemplary embodiments, however, the letters "a" and "b" have been added to the reference numerals of the exemplary embodiments. The description below is essentially limited to the differences relative to the exemplary embodiment shown in FIGS. 1 through 3; for a description of parts, features, and functions that remain the same, the reader should refer to the description of the exemplary embodiment shown in FIGS. 1 through 3.

FIG. 4 shows a section through an output-end part of an alternative hand-held power tool 10a or cordless hand-held power tool 12b in the form of a cordless screwdriver 66b with a torque-limiting device 14b that is provided to set a maximum torque that can be transmitted to a tool-driving element 18b by means of a motor output 16b, in an unblocked state.

The hand-held power tool 10b is also associated with a spring mechanism 20b that has a first disk spring 22b that acts on a plurality of detent mechanisms 24b, 26b arranged in a circumference direction 38b, each equipped with a respective detent element 28b, embodied in the form of a rolling element 30b or ball 86b, and an additional rolling element 32b situated axially behind the detent element 28b in an output direction 90b. The spring mechanism 20b also has two additional disk springs, namely a second disk spring 42b and a third disk spring 44b, which extend in a circumference direction 38b spaced radially apart from and around a working spindle 72b and also around a radially narrowed section 106b of a transmission housing 50b and are connected to one another in series.

The three disk springs 22b, 42b, 44b have different outer diameters 54b, 54b' and/or inner diameters 56b, 56b' as a result of which the three disk springs 22b, 42b, 44b have different spring characteristics. In this exemplary embodiment, the disk spring 22b has a first outer diameter 54b that is greater than a second outer diameter 54b' of the disk springs 42b and 44b. In addition, the disk spring 42b has a first inner diameter 56b that is greater than a second inner diameter 56b' of the disk springs 22b and 44b. In general, however, it would also be conceivable to provide any other variation of the outer and/or inner diameters 54b, 54b', 56b, 56b' of the disk springs 22b, 42b, 44b deemed suitable by the person skilled in the art. The different outer diameters 54b, 54b' and/or inner diameters 56b, 56b' achieve different lever arms between force exertion points 126b of the disk springs 22b, 42b, 44b.

The foregoing relates to preferred exemplary embodiments of the invention, it being understood that other variants and embodiments thereof are possible within the spirit and scope of the invention, the latter being defined by the appended claims.

I claim:

1. A hand-held power tool, in particular a cordless power tool, having
a transmission housing,
a torque-limiting device mounted on said transmission housing that is provided for setting a maximum torque that a motor output of said power tool is able to transmit to a tool-driving element of said power tool,
a spring mechanism mounted around said transmission housing equipped with at least one first disk spring, wherein the at least one disk spring acts on at least two detent mechanisms arranged in a circumferential direction,
at least one adjusting means comprising a ring member rotatably mounted on and around said transmission housing; said ring member acting directly on the at least one disk spring, wherein said ring member has a thread which interacts with a thread on said transmission housing, said at least one adjusting means further includes a collar member rotatably mounted on said transmission housing and adapted to rotate said ring member, said collar member being manually adjustable by a user to compress or decompress said at least one first disk spring.

2. The hand-held power tool as recited in claim 1, wherein each detent mechanism has at least one first detent element.

3. The hand-held power tool as recited in claim 2, further having a guide device that fixes at least the first detent element in at least one circumference direction.

4. The hand-held power tool as recited in claim 2, further having at least the first detent element is embodied in the form of a rolling element.

5. The hand-held power tool as recited in claim 4, further having a guide device that fixes at least the first detent element in at least one circumference direction.

6. The hand-held power tool recited in claim 4, further having at least one additional rolling element that is situated on a side of the at least one detent element oriented toward the disk spring.

7. The hand-held power tool as recited in claim 6, further having a guide device that fixes at least the first detent element in at least one circumference direction.

8. The hand-held power tool as recited in claim 1, wherein the spring mechanism has at least one additional disk spring.

9. The hand-held power tool as recited in claim 8, wherein at least the first disk spring and the additional disk spring are connected in series.

10. The hand-held power tool as recited in claim 9, wherein the first disk spring and the additional disk spring have different spring characteristics.

11. The hand-held power tool as recited in claim 9, wherein the first disk spring and the additional disk spring have different material thicknesses.

12. The hand-held power tool as recited in claim 9, wherein the first disk spring and the additional disk spring have different outer diameters and/or inner diameters.

13. The hand-held power tool as recited in claim 9, wherein a harder-acting disk spring of the first disk spring and the additional disk spring is situated on a side of the spring mechanism oriented toward the detent element.

14. The hand-held power tool as recited in claim 1, wherein a solid compression of the spring mechanism produces a blocking of the torque-limiting device.

15. The hand-held power tool as recited in claim 1, wherein the torque-limiting device has at least one clutch that is embodied as at least partially integral to at least one component of a planetary gear set.

* * * * *